United States Patent
Kleynhans et al.

(10) Patent No.: US 12,493,906 B2
(45) Date of Patent: Dec. 9, 2025

(54) CROSS-SYSTEM RECOMMENDER

(71) Applicant: FMR LLC, Boston, MA (US)

(72) Inventors: Bernard Kleynhans, Cambridge, MA (US); Serdar Kadioglu, Somerville, MA (US); Ramesh Baral, Durham, NC (US)

(73) Assignee: FMR LLC, Boston, MA (US)

( * ) Notice: Subject to any disclaimer, the term of this patent is extended or adjusted under 35 U.S.C. 154(b) by 109 days.

(21) Appl. No.: 18/593,624

(22) Filed: Mar. 1, 2024

(65) Prior Publication Data
US 2025/0278771 A1    Sep. 4, 2025

(51) Int. Cl.
*G06Q 30/00*    (2023.01)
*G06Q 30/0204*    (2023.01)
*G06Q 30/0601*    (2023.01)

(52) U.S. Cl.
CPC ..... *G06Q 30/0631* (2013.01); *G06Q 30/0204* (2013.01)

(58) Field of Classification Search
CPC ..................................................... G06Q 30/06
See application file for complete search history.

(56) References Cited

U.S. PATENT DOCUMENTS

2021/0110306 A1*    4/2021    Krishnan ................. G06N 3/08
2025/0061117 A1*    2/2025    Shamir ............. G06F 16/24578

\* cited by examiner

*Primary Examiner* — Mila Airapetian
(74) *Attorney, Agent, or Firm* — Cesari and McKenna, LLP

(57) ABSTRACT

A method for generating cross-channel recommendations for a customer includes receiving customer data associated with the customer, content data, and clickstream data; encoding the content data using a text encoder, the encoding resulting in content embeddings; encoding the clickstream data using a clickstream encoder, the encoding resulting in clickstream embeddings; providing the content data, the clickstream data, and the clickstream embeddings as inputs to a hybrid latent model; causing execution of the hybrid latent model, the execution resulting in cross-system user and item interaction embeddings; retrieving application features corresponding to the clickstream data from an application feature store; providing the customer data, the content embeddings, the clickstream embeddings, the cross-system user and item interaction embeddings, and the application features as inputs to a recommendation model; causing execution of the recommendation model, the execution resulting in a plurality of ranked recommendations.

20 Claims, 9 Drawing Sheets

602

| Customer | Tenure | Number of Accounts | Has Retirement Account | ... | Number of Trades |
|---|---|---|---|---|---|
| U_1 | 34 | 1 | 1 | | 1 |
| U_2 | 3 | 1 | 0 | | 12 |
| ... | | | | | |
| U_M | 45 | 2 | 0 | | 0 |

Fig. 6

| Application | Total Clicks | CTR | Total Customers | Recent Items |
|---|---|---|---|---|
| A_1 | 97,646 | 0.097 | 639,492 | 43 |
| A_2 | 9,360 | 0.013 | 335,068 | 47 |
| ... | | | | |
| A_N | 12,614 | 0.052 | 205,763 | 9 |

Fig. 7

CROSS-SYSTEM RECOMMENDER

BACKGROUND

Technical Field

The present invention relates to recommendation systems and methods, and more specifically to generate cross-channel recommendations for a customer.

Background

A recommendation system is a subclass of information filtering systems that provides suggestions for items that are most pertinent to a particular user in a particular context. Recommendation systems are particularly useful when an individual needs to choose an item from a potentially overwhelming number of items that a business may offer. Recommendation systems generally use collaborative filtering, content-based filtering, knowledge-based, graph-based, and hybrid techniques. Collaborative filtering approaches build a model from a customer's past behavior (items previously consumed or selected and/or numerical ratings given to those items) as well as similar decisions made by other customers. This model is then used to predict items (or ratings for items) that the customer may have an interest in. Content-based filtering approaches utilize a series of discrete, pre-tagged characteristics of an item in order to recommend items with similar properties. Knowledge-based recommenders use domain-based knowledge and some reasoning to recommend relevant items to a user. Graph-based recommenders represent users and items as graph and use graph-based properties and methodologies to find relevant items to a user. Hybrid techniques fuse more than one technique to generate recommendations.

Providing personalized digital experiences at scale is a challenging problem for any business. The problem is even more challenging when a business offers multi-channel and multi-context services. Customers can have multiple digital interactions with a business each day. These interactions can vary by channel (e.g., web, mobile, email) and by context (e.g., financial portfolio summary, financial planning tool, learning for a financial business). Traditional recommendation systems, or recommenders, are limited to a single channel or single application. In other words, a business may utilize three different recommenders: one for customer interactions through web pages, a second one for customer interactions through a mobile app, and a third one for customer interactions through email. Similarly, a business may have separate recommenders for different context. This prevents the recommenders from learning and utilizing cross-context and cross-channel user behaviors. This leads to siloed data and severely limits the performance and usefulness of the recommenders' outputs.

SUMMARY

The deficiencies of the prior art are remedied by providing a cross-system recommender that learns from customer interactions across multiple channels, or systems. The cross-system recommender described herein enables more relevant and consistent personalized recommendations across different contexts with improved engagement and take-action rates based on offline evaluations. Furthermore, it allows the business to immediately provide personalized recommendations for new experiences, without expensive randomized data collection and model training, thereby realizing business value sooner. Finally, the cross-system recommender described herein can be scaled to multiple experiences with limited incremental effort from data science and engineering resources. Furthermore, the recommender can be designed to be generic so that any set of features and algorithm can be plugged in with minimal or no modification to the system.

In accordance with an embodiment of the present invention, a computer-implemented method for generating a plurality of cross-channel recommendations for a customer includes receiving, by a computer system, content (interchangeably referred to as item) data, customer (interchangeably referred to as user) data associated with the customer, customer digital behavior or clickstream behavior, user-item interaction data, cross-system interaction embeddings, and application features.

The method includes encoding, by the computer system, the content data using a text encoder, the encoding resulting in content embeddings. The text encoder can use the content data as input and utilize a text embedding TFIDF-NMF (Term frequency Inverse Document Frequency-Non-negative Matrix Factorization), to generate a latent representation of the content.

In some embodiments, the method includes encoding, by the computer system, the user features using several encoding techniques. The user features can consist of demographic and user profile specific features, such as account and transaction data. Methods may include retrieving, by the computer system, user features from feature store.

In certain embodiments, the method includes encoding, by the computer system, the users' digital behavior or clickstream behavior using a clickstream embedder. The user clickstream embeddings are computed using the cross-channel digital behavior of users. The clickstream embedder consists of two major components, an encoder that encodes the set of items a user interacted within a timeframe, and an aggregator that aggregates the encoded representation of items interacted by a user. The encoder utilizes the TFIDF (Term frequency Inverse Document Frequency) encoding technique. The aggregator utilizes a weighted decay aggregation technique to give higher weights to recently interacted items.

The user-item interaction data can include data from a plurality of channels and at least one of the channels has a different type from another channel of the plurality of channels.

The method, in some embodiments, includes providing, by the computer system, the content data, the user-item interaction data, and the user features as inputs to a properly tuned hybrid latent model. The method may also include causing, by the computer system, execution of the hybrid latent model, the execution resulting in cross-system interaction embeddings for each user and item. The hybrid latent model may use hybrid matrix factorization model.

The method may include causing, by the computer system to feature engineer application-level statistical features, such as click-through-rate, number of unique customers, number of unique presented items, and usage volume. The method can include retrieving, by the computer system, application features from feature store.

The method can further include providing, by the computer system, the content embeddings, the customer features, the customer clickstream embeddings, the cross-system interaction embeddings, and the application features, as inputs to a recommendation model. The method includes causing, by the computer system, execution of the recommendation model, the execution resulting in a plurality of ranked recommendations. The recommendation model may use gradient boosting technique.

Also alternatively, or in addition, the method can include filtering, by the computer system, the plurality of ranked recommendations. The method may also further include re-ranking, by the computer system, the plurality of ranked recommendations. Alternatively, or in addition, the method may further include causing, by the computer system, display of at least one of the plurality of recommendations to the customer.

In accordance with another embodiment of the present invention, a system for generating a plurality of cross-channel recommendations for a customer includes a hybrid latent model, a cross-channel recommendation model, and a computer system having a processor coupled to a memory. The computer system is communicatively coupled only to the recommendation model, making it robust and flexible enough to provision the substitution of the recommendation algorithm with any other compatible algorithms.

The processor may be configured to receive customer data associated with the customer, content data, and clickstream data. The processor can be configured to encode the content data using a text encoder, the encoding resulting in content embeddings. In some embodiments, the processor is configured to encode the clickstream data using a clickstream encoder, the encoding resulting in clickstream embeddings.

Alternatively, or in addition, the clickstream data includes data from a plurality of channels and at least one channel of the plurality of channels has a different type from another channel of the plurality of channels. The clickstream data may include at least one of clickstream data associated with the customer and a web page and clickstream data associated with the customer within a timeframe. The customer data may include at least one of demographic data, account data, and transaction data.

In addition, the application features include at least one of click-through-rate, number of unique customers, number of unique presented items, and usage volume.

The processor is configured to provide the customer data, the clickstream data, and optionally the content data as inputs to the hybrid latent model. The hybrid latent model may include a matrix factorization framework. The processor is configured to cause execution of the hybrid latent model, the execution resulting in cross-system interaction embeddings.

The processor may be configured to retrieve application features corresponding to the clickstream data from an application feature store. The processor is configured to provide the customer data, the content embeddings, the clickstream embeddings, the cross-system interaction embeddings, and the application features as inputs to a recommendation model, which may use gradient boosting. The processor is configured to cause execution of the recommendation model, the execution resulting in a plurality of ranked recommendations. Also alternatively, or in addition, the processor is further configured to filter the plurality of ranked recommendations. The processor may also be further configured to re-rank the plurality of ranked recommendations.

In accordance with yet another embodiment of the present invention, a non-transitory computer-readable medium has software encoded thereon. The software, when executed by a computer system, is operable to receive content data, customer data associated with a customer, clickstream data, and user-item interaction data. The software is operable to encode the content data using a text encoder, the encoding resulting in content embeddings. The software is operable to encode the clickstream data using a clickstream embedder, resulting in clickstream embeddings. The software is operable to provide the content data, the customer data, and the user-item interaction data as inputs to a hybrid latent model. The software is operable to cause execution of the hybrid latent model, the execution resulting in cross-system interaction embeddings. The software is operable to retrieve application features corresponding to the clickstream data from an application feature store. The software is operable to provide the customer data, the content embeddings, the clickstream embeddings, the cross-system interaction embeddings, and the application features as inputs to a recommendation model. The software is operable to cause execution of the recommendation model, the execution resulting in a plurality of ranked recommendations.

BRIEF DESCRIPTION OF THE DRAWINGS

The description below refers to the accompanying drawings, of which:

FIG. 6 is an illustration of exemplary customer data in accordance with an embodiment of the present invention; and FIG. 7 is an illustration of exemplary application features in accordance with an embodiment of the present invention.

DETAILED DESCRIPTION OF ILLUSTRATIVE EMBODIMENTS

Figure 1:
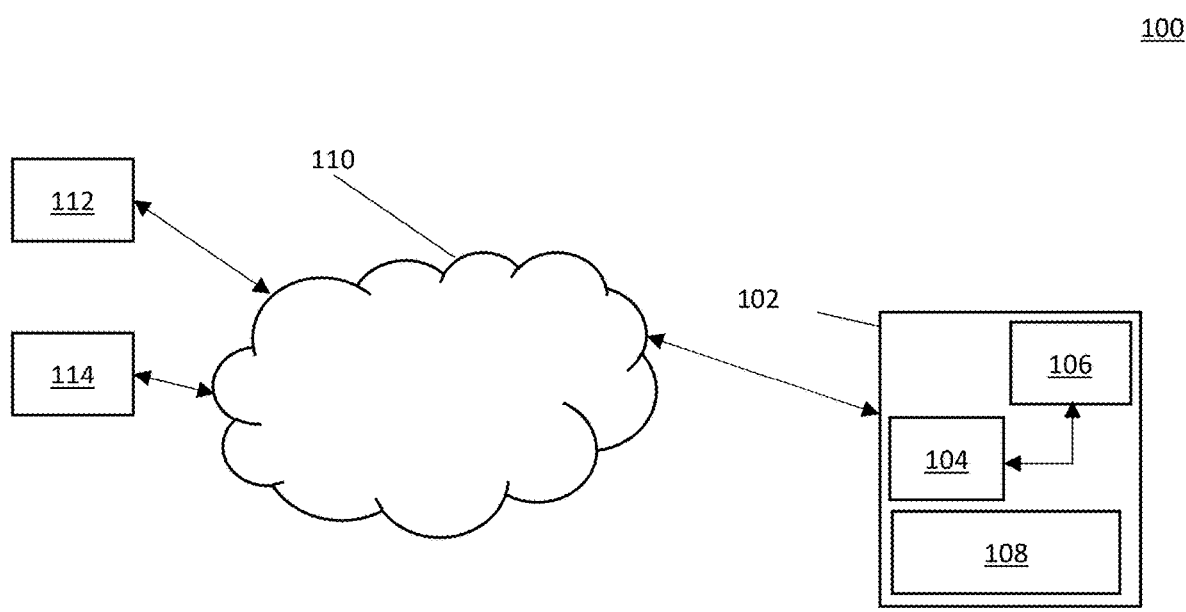
FIG. 1 is an illustration of a system for generating a plurality of cross-channel recommendations for a customer in accordance with an embodiment of the present invention.

FIG. 1 is an illustration of a system 100 for generating a plurality of cross-channel recommendations for a customer in accordance with an embodiment of the present invention. System 100 includes a computer system 102. The computer system 102 has a processor 104 coupled to a memory 106. The computer system 102 may also be communicatively coupled to a communications network 110. Network 110 may be a public network, such as the internet, or it may be a private network, such as a network internal to a company. Network 110 also may be a combination of public and/or private networks. The computer system 102 may be coupled to the network 110 directly, for example via an Ethernet cable or via wireless connection such as Wi-Fi. Computer system 102 may also be coupled to the network 110 in any other way known to the skilled person, for example indirectly through another device (not shown), such, as, but not limited to, a router, a switch, a hub, a separate computer system, a mobile device, a modem, and/or a combination of these devices. The processor 104 is configured to execute the method described below in detail with reference to FIG. 2. While a processor 104 is described herein, it is expressly contemplated that the computer system 102 has a plurality of processors. In that case, each of the plurality of processors of computer system 102 is coupled to the memory 106 and is configured to execute the method described below.

In some embodiments, computer system 102 further includes a recommendation generation module 108, executing on processor 104. In that case, the recommendation generation module 108 is configured to execute the method described below in detail with reference to FIG. 2. Recommendation generation module 108 may include specialized set of computer software instructions programmed onto one or more dedicated processors in computer system 102 and may also include specifically designed memory locations and/or registers for executing the specialized computer software instructions. Although, the recommendation generation module 108 is shown as part of and executing within computer system 102, it is expressly noted that the functionality of recommendation generation module 108 can be distributed among a plurality of computer systems. Computer system 102 enables recommendation generation module 108 to communicate with network 110 in order to exchange data for the purpose of performing the described functions. It should be appreciated that any number of computing devices, arranged in a variety of architectures, resources, and configurations (e.g., cluster computing, virtual computing, cloud computing) can be used without departing from the scope of the invention. Exemplary functionality of recommendation generation module 108 is described in detail throughout the specification.

Also communicatively coupled to the network 110 is a machine learning platform 112. The machine learning platform 112 may be accessed by the computer system 102 over the network 110 and enables the computer system 102 to cause execution of one or more machine learning models. Exemplarily, the machine learning platform 112 may be a commercially available machine learning platform that provides and executes one or more machine learning models. One example of such a publicly available platform is XGBoost, publicly available at xgboost.ai. This machine learning platform enables users to create, train, and deploy machine learning models in the cloud and/or on dedicated computing devices. It is expressly noted, as further explained below, that any other suitable machine learning platform known to the skilled person or any combination of suitable machine learning platforms, accessible either publicly or privately, may be used instead of or in addition to XGBoost. Any of these machine learning platforms 112 may be accessed through the cloud or through network 110 and/or may be executed on computer system 102.

In some embodiments, a database 114 may be coupled to the network 110. The database 114 may be provided by any publicly available database system known to the skilled person. It may be a commercial database or an open-source database. While the database 114 is shown here coupled to the network 110, it is also expressly contemplated that the database 114 may be hosted on the computer system 102. The database 114 allows the computer system 102 to store and retrieve data, for example from one or more data stores.

Figure 2:
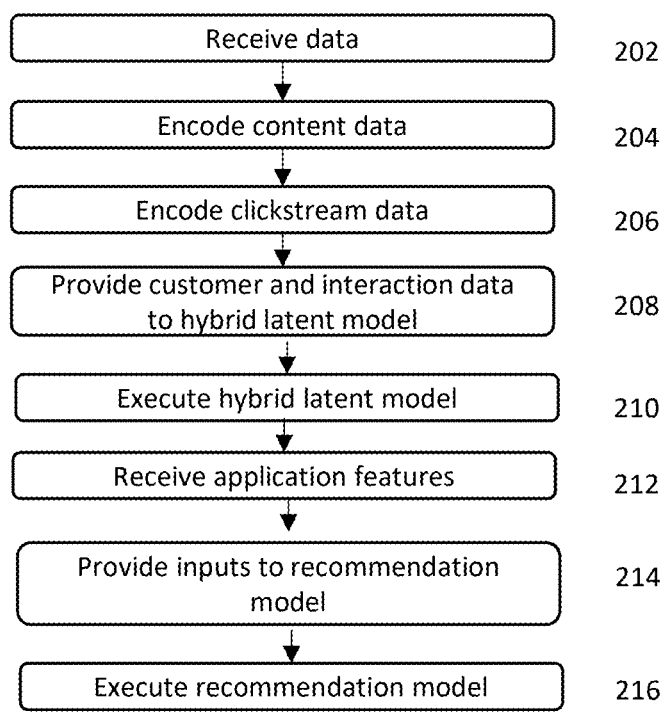
FIG. 2 is a flowchart of a method for generating a plurality of cross-channel recommendations for a customer in accordance with an embodiment of the present invention.

FIG. 2 is a flowchart of a computer-implemented method 200 for generating cross-channel recommendations for a customer in accordance with an embodiment of the present invention. Specifically, method 200 may be executed by one or more processors 104 of computer system 102 as described above with reference to FIG. 1. Similar to what is described above, the computer system 102 is coupled to a communications network 110. Also coupled to the communications network 110, or hosted on the computer system 102, may be a machine learning platform 112 and a database 114, as described above. Also, in some embodiments and as described above, method 200 may be executed by a recommendation generation module 108 executing on one or more processors 104 of computer system 102. While computer system 102 is described herein as executing the method 200, it is expressly noted that the method 200 may also be executed, in part or entirely, by recommendation generation module 108. As an example, the steps 202, 204, 206, 208, and 210 can be executed offline to generate the features that are used as input to the cross-channel recommendation model. The recommendation model can then use those features to promptly infer recommendations for a given user. It is also possible to execute the steps 204, 206, 208, and 210 in parallel mode to optimize the resource usage and to reduce the latency of recommendation generation.

In step 202, the computer system 102 receives customer data associated with the customer, content data, and clickstream data. These various forms of data may be associated with customer interactions via multiple channels, such as via online chat, email, interaction of the customer with a virtual assistant, social media chats and/or posts, interaction with a website, interaction with a mobile app, and/or any other channel known to the skilled person. Computer system 102 may also receive additional data. The computer system 102 may receive the data in any way known to the skilled person. For example, the computer system 102 may receive the data from database 114 and/or over the network 110. The computer system 102 may also receive the data using a combination of methods. For example, the computer system 102 may receive the content data and clickstream data from database 114 and the customer data as user input.

Figure 3:
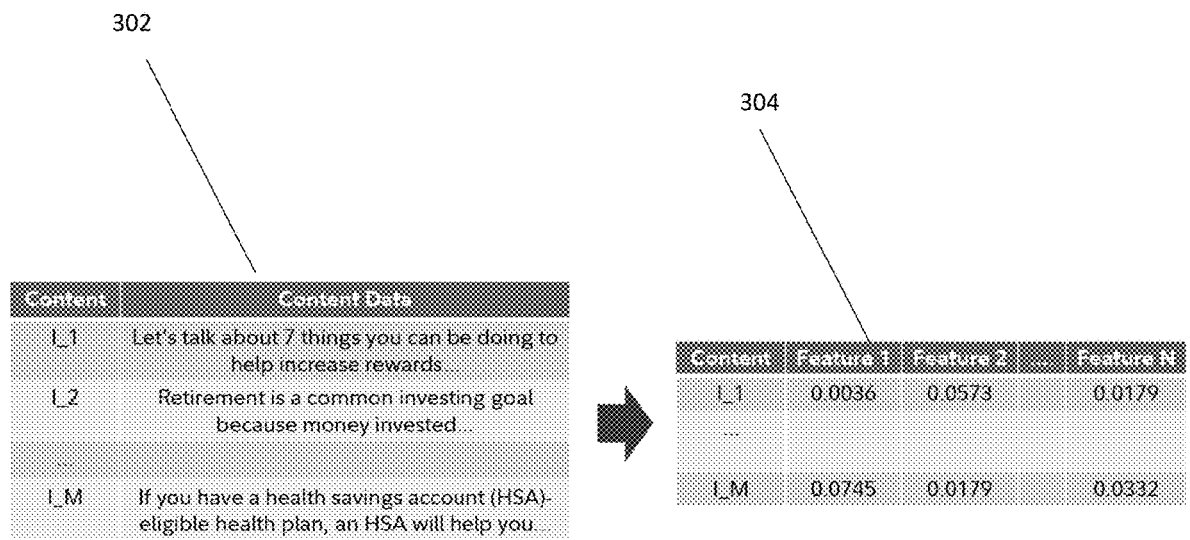
FIG. 3 is an illustration of exemplary content data and content embeddings in accordance with an embodiment of the present invention.

An example of content data received by computer system 102 is shown in table 302 of FIG. 3. As can be seen, the content data relates to possible content items that may appear in any channel, such as a web page, mobile app page, and/or social media posts. Each possible item of content is associated with an identifier. In the example of FIG. 3, the content item related to what to do to increase rewards is associated with identifier I_1. The content item about retirement as a common investing goal is associated with identifier I_2. The content item about opening a health savings account is associated with the last identifier in the content data, here labeled as I_M. As can be seen, any number of potential items of content may be included in the content data, identified by identifiers I_1 to I_M, with M being the total number of potential content items in the content data.

Figure 4:
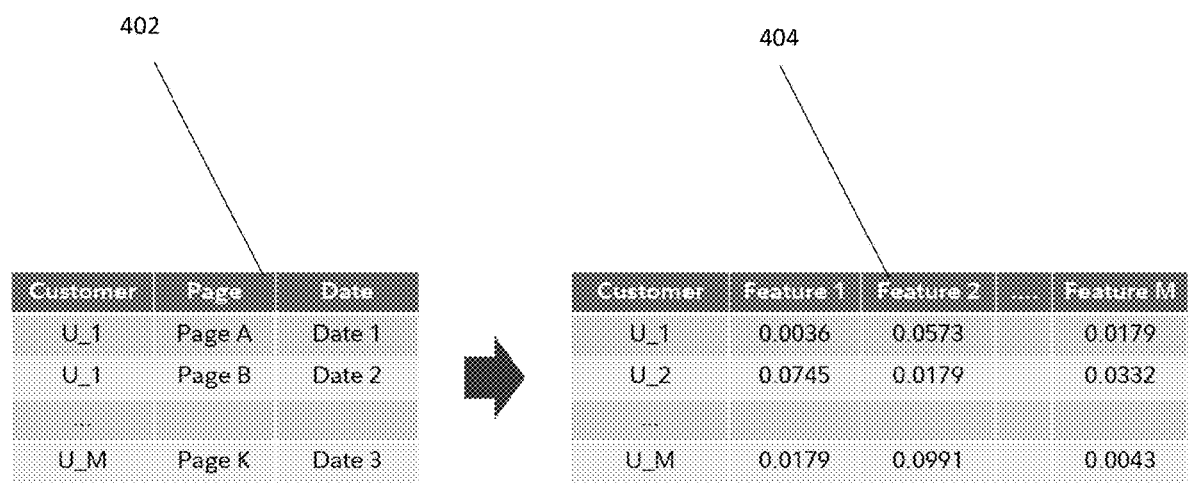
FIG. 4 is an illustration of exemplary clickstream data and clickstream embeddings in accordance with an embodiment of the present invention.

The clickstream data includes historic digital activity of customers with one or more channels. The clickstream data may include data related to one customer or to a plurality of different customers. Similarly, the clickstream data may include data related to a single channel or to a plurality of different channels. For example, the clickstream data may include data related to interactions of a specific customer with a specific channel. To this end, the clickstream data may include interactions of a specific customer with a website of the business. The clickstream data may also include interactions of more than one customer with the website. In another example, the clickstream data may include interactions of a specific customer with more than one channel, such as the interactions of a customer with the business website and mobile app. The data may be limited to a certain timeframe, such as the interactions of a customer with the website and mobile app over the last year. In yet another example, the clickstream data may include interactions of more than one customer with a specific channel, such as interactions of all customers with the mobile app. The clickstream data may therefore include any combination of suitable data known to the skilled person. Table 402 in FIG. 4 shows an example of clickstream data that may be received by computer system 102. The illustrative table includes interactions of M customers with K web pages. The customer identified by U_1 interacted with page A on Date 1. The customer identified by U_2 interacted with page B on Date 2. The customer identified by U_M interacted with page K on Date 3. While interactions of customers with pages are shown here, it is expressly contemplated that the clickstream data may be of any desired specificity. For example, instead of web pages the data may include interactions of customers with links and/or interactive elements on the business website. In addition, while interactions of customers with a single channel, the website, are shown here, it is noted that the clickstream data may include data from a plurality of channels. Exemplarily, the computer system 102 may receive clickstream data for a mobile app and for interaction with a website. It is noted that the computer system 102 may also, or instead, receive clickstream data for any other combination of different channels. In other words, the clickstream data received by computer system 102 may include data related to at least two different channels.

The customer data includes data associated with one or more customers of the business. In an example, the customer data includes an identifier for one or more customers. In another example, the customer data includes data in addition to or instead of the customer identifier. Table 602 in FIG. 6 shows an illustration of customer data for three customer identifiers. The exemplary table includes data related to the tenure of the customer with the business, the number of accounts the customer has, whether the customer has a retirement account with the business, and the number of trades the customer executed in a given timeframe or over the lifetime of the customer's relationship with the business. The computer system 102 may receive the additional customer data from a different source than the customer identifier. For example, the computer system 102 may first receive a customer identifier as user input and then may receive the additional data shown in table 602 from a customer profile store. The customer profile store may store data related to demographic, account, and transaction data for each customer of the business. The customer profile store may be part of computer system 102 or it may be accessed over network 110. For example, the customer profile store may be stored in database 114. In another example, the customer profile store may be distributed over more than one system. The database 114 may provide data related to a customer's tenure and number of accounts, and another database may provide data related to a customer's number of trades.

Figure 8:
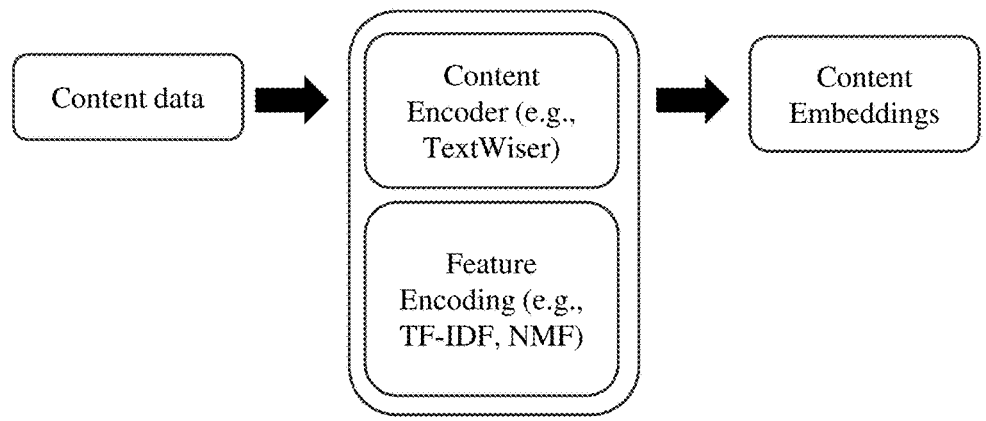
FIG. 8 illustrates a content encoding process according to certain embodiments.

In step 204, the computer system 102 encodes the content data using a text encoder. The encoding results in content embeddings. Illustratively, the text encoder may be the TextWiser library, publicly available at github.com/fidelity/textwiser. TextWiser is a library that provides a unified framework for text featurization while taking advantage of pretrained models. For example, TextWiser provides more than 25 different options for text embeddings and various options for further transforming the generated embeddings. Examples of embeddings are Bag of Words, Term Frequency Inverse Document Frequency (TF-IDF), BERT, GPT, GPT2, and Transformer. To generate some of these embeddings, TextWiser relies on other pretrained models. For example, TextWiser relies on the GPT and GPT2 models (OpenAI, San Francisco, CA) to generate the GPT and GPT2 embeddings, respectively. Examples of transformations that may be applied to the embeddings are singular value decomposition (SVD), non-negative matrix factorization (NMF), and uniform manifold approximation and projection (UMAP). The computer system 102 may use any suitable model known to the skilled person, through TextWiser or any other text encoder, to generate the content embeddings. The computer system 102 may also select the parameters for TextWiser in any suitable way. For example, the computer system 102 may set the minimum document frequency for a word to 1, meaning that every word that appears at least once in the content data is used to generate the embeddings. The computer system 102 may also set the dimension of the embeddings to 30. While 30 is used in the example described herein, the feature dimension of the embeddings vector may be set to any suitable number. An example of content embeddings can be seen in table 304 of FIG. 3. Each content embedding includes an identifier that corresponds to the same identifier in content data 302. Therefore, each row of the content data table 302 is associated with a corresponding row of the content embeddings table 304. The content embeddings are latent representations of the content items, which means the similar content items are located closer in the latent space. This similarity trend helps the recommender to capture the user-item affinity and expand the context across relevant content items. An exemplary method for completing step 204 is shown in FIG. 8.

In step 206, the computer system 102 encodes the user clickstream data using a clickstream encoder. The encoding results in clickstream embeddings. Illustratively, the computer system 102 encodes the clickstream data to generate digital behavioral features for each customer. The method of encoding the clickstream data may vary between different types of clickstream data. To embed clickstream data related to a web page and/or mobile app, the computer system 102 may use a clickstream encoder such as the TextWiser library and the textual contents of the respective web page and/or mobile app. Specifically, the computer system 102 may use TextWiser to generate TF-IDF embeddings. The input to TextWiser may be any text found on the web page and/or mobile app. For example, the computer system 102 may provide the entire textual content of a web page as input to the clickstream encoder, or the computer system 102 may provide only a portion of the textual content of the web page as input to the clickstream encoder. The clickstream encoder, such as TextWiser, then uses TF-IDF weighting to re-weight an input value, such as a word count of words in the clickstream data, the input into floating point values suitable for usage by a classifier. The re-weighting is necessary, because some words such as "the", "a", or "is" are present very frequently in English language text and hence carry little meaningful information about the actual contents of the web page and/or mobile app page. If the textual contents of the page or app were encoded without re-weighting, those very frequent words would shadow the frequencies of rarer yet more interesting terms. TF-IDF, as known to the skilled person, therefore provides a measure of importance of a word or term in a document, such as the textual contents of a web page or mobile app. TF-IDF relates to the product of two statistics: term frequency (TF) and inverse document frequency (IDF). TF is the frequency of a term within a document. There are various ways to calculate TF, such as the raw count (how often the term appears in the document), the relative frequency (raw count divided by the total number of terms in the document, counting each occurrence of the same term separately), or any other suitable way known to the skilled person. IDF is a measure of how much information a term or word provides, in other words if the term is common or rare across all documents in a collection of documents. In the example of a web page or a mobile app page, the collection of documents may include all web pages of a business or a subset of them, and/or all pages of a mobile app or a subset of them. Again, there are various ways to calculate IDF, including dividing the total number of documents by the number of documents containing the term and then taking the logarithm of that quotient, or any other suitable way known to the skilled person. TF-IDF can then be calculated as the product of TF and IDF. A high weight in TF-IDF is reached by a high TF in a given document and a low IDF in the whole collection of documents, i.e., a term that appears frequently in a specific document but rather infrequently in the collection of documents. This weights filter out common terms in the documents. TF-IDF thus results in a re-weighted embedding of the textual contents of the web page and/or mobile app page. The clickstream encoder may then apply a transformation to the re-weighted embedding. Illustratively, the clickstream encoder may apply non-negative matrix factorization (NMF) to the output of the TF-IDF step. NMF, as known to the skilled person, factorizes a matrix into two matrices with the property that all three matrices have no negative elements. In the example given here, the output of the TF-IDF is inherently non-negative since no word in a document can have a negative weighted frequency. NMF has an inherent clustering property, thus automatically clusters the input data, and may be used for dimensionality reduction of the input data. In other words, NMF can be used instead of principal component analysis (PCA) or its variants to identify the most significant components of a matrix or vector. The clickstream encoder therefore uses NMF to further reduce the dimensionality of the re-weighted embedding generated by TF-IDF, resulting in a clickstream embedding that has a lower dimensionality than the TF-IDF embedding. The embeddings with reduced dimension are efficient enough to maintain the variance across all the embeddings and also help to reduce the memory footprint during training and inferring from the recommender.

Figure 9:
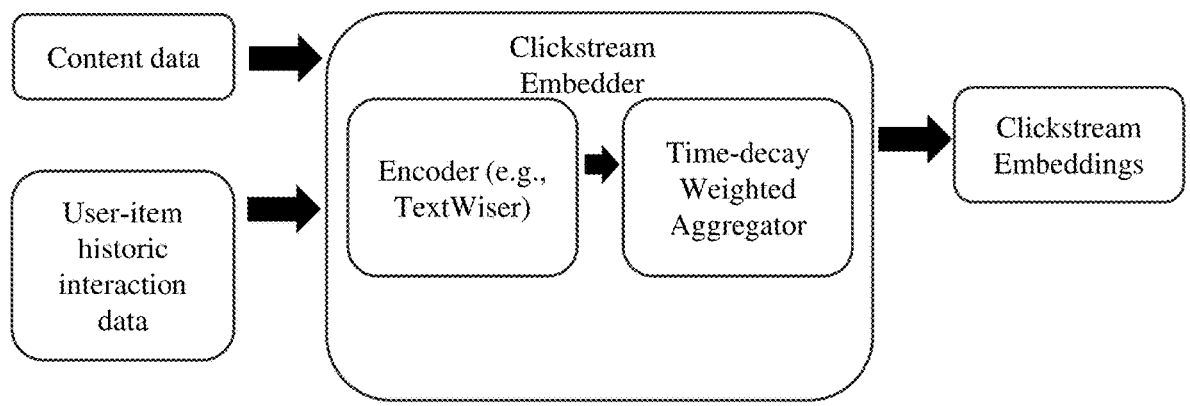
FIG. 9 illustrates a clickstream encoding process according to certain embodiments.

In another example, the computer system 102 may use the clickstream encoder to generate embeddings related to a user. The input data therefore may be clickstream data related to all web pages and/or mobile app pages that a specific user visited in a specific timeframe. For example, the input data may relate to all pages, or a subset thereof, visited within the last three months. The clickstream encoder then may generate embeddings for each one of the pages included in the clickstream data as described above. After generating embeddings for each one of the pages, the clickstream encoder may apply weighted time-decayed aggregation of the embeddings to generate the clickstream embeddings for the aggregated clickstream data. For example, the clickstream encoder may give the most recent data a higher weight than data generated three months ago. This ensures that, while all interactions of a customer in a certain timeframe are considered, the most recent data is considered more important. The weighted time-decayed aggregation may be implemented in any way known to the skilled person. Illustratively, the clickstream encoder may assign a weight of 1 to the most recent data, and then reduce the assigned weight by 0.01 for each day. This means that one-day old clickstream data would be assigned a weight of 0.99, two-day old data a weight of 0.98, and 90-day old data a weight of 0.11. The clickstream encoder may then sum the weighted embeddings for each page and normalize the sum to result in the output clickstream embeddings. To generate the clickstream embeddings, the computer system 102 may set the parameters of the clickstream encoder in any suitable way. Using the example herein, the computer system 102 may use the TextWiser encoder and set the minimum document frequency to 20 and the time window to 3. This means that the textual contents of all web pages and/or mobile app pages that the user interacted with in the last 3 months is used as an input, and that only words appearing at least 20 times in the collection of documents are included in the embeddings. The computer system 102 may also set the dimension of the embeddings vector to 25. While 25 is used in the example described herein, the feature dimension for the vector of clickstream embeddings may be set to any suitable number. An example of clickstream embeddings per user can be seen in table 404 of FIG. 4. Each clickstream embedding includes a customer identifier that corresponds to the same customer identifier in the clickstream data 402. Therefore, each row of the clickstream embeddings table 404 is associated with a corresponding one or more rows, associated with the same user, of clickstream data table 402. An exemplary method for completing step 206 is shown in FIG. 9.

In step 208, the computer system 102 provides the customer data, and the user-item interaction data as inputs to a hybrid latent model. Alternatively, the content data can also be provided as an input to the hybrid latent model. The hybrid latent model may include a matrix factorization framework, which describes a class of collaborative filtering algorithms used in recommender systems. Matrix factorization includes decomposing a user-item interaction matrix into user-latent feature and item-latent feature matrices. The user-latent feature matrix and item-latent feature matrix are of lower dimension and the matrix factorization technique learns these matrices by approximating the product of these two matrices to be equivalent to the user-item interaction matrix. The output of a matrix factorization framework therefore represents customers and contents in a lower-dimensional latent spaces. Illustratively, the computer system 102 uses the hybrid latent model provided by LightFM, publicly available and described at making.lyst.com/lightfm/docs/home.html. LightFM provides a hybrid matrix factorization model for both implicit and explicit customer interactions. It can integrate the user and item data into the classical matrix factorization algorithm, enriching the feature set for the underlying learning to rank technique. Fusing the user and item data into the user-item interaction data makes the process efficient even in the cold-start settings, where the system needs to learn features of new users or items. The model represents customers and items as combination of their latent features. The model may use Weighted Approximate-Rank Pairwise (WARP) loss to optimize the learning to rank problem via negative sampling technique. The WARP utilizes user, positive content, negative content triplets, where the negative contents are chosen from the set of negative contents that do not satisfy the expected content ranking. For a given user, positive content pair, a negative content is sampled. The prediction for both positive and the sampled negative content are computed. If the prediction of the negative content exceeds that of the positive content beyond some threshold, a gradient update is performed to rank the positive content higher and the negative content lower. If the prediction of negative content does not exceed that of the positive content beyond some threshold, continue sampling without updating the gradients. A detailed description of the hybrid latent model provided by LightFM is publicly available at arxiv.org/pdf/1507.08439.pdf and is incorporated herein by reference in its entirety.

Figure 5:
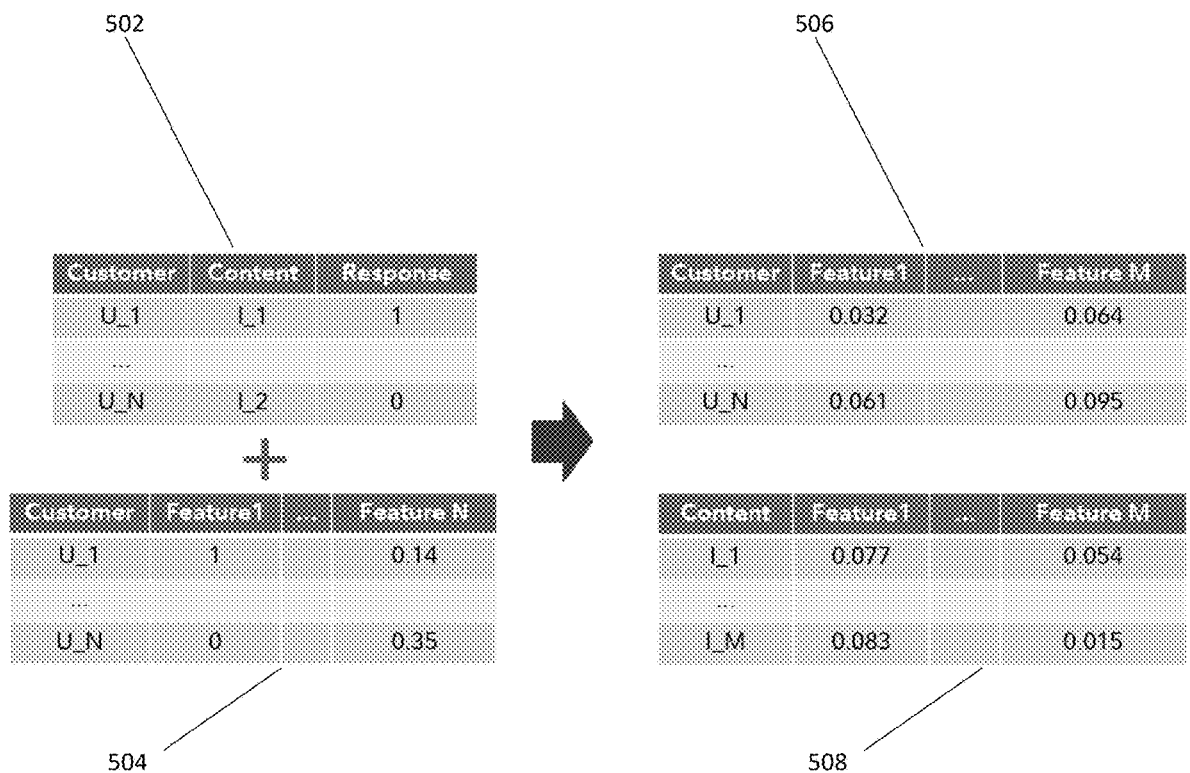
FIG. 5 is an illustration of exemplary inputs and outputs of a hybrid latent model in accordance with an embodiment of the present invention.

An example of inputs and outputs of the hybrid latent model is shown in FIG. 5. The model's inputs are shown in tables 502 and 504. Table 504 corresponds to the user features or alternatively user clickstream embeddings, as seen for example in table 404 in FIG. 4. Each customer identifier is associated with a feature vector that represents the profile specific feature associated with the customer. Table 502 includes the user-item interaction data and the Table 504 includes the user data, which can be the clickstream data or user profile data. Illustratively, table 502 includes data related to whether a certain customer responded to a certain content item on a channel such as a web page or mobile app page of the business. Computer system 102 may generate table 502 from the clickstream data, the content data, and the actual contents of the channels. For example, the clickstream data may indicate that customer U_1 clicked on page A. The computer system 102 then uses the content data to determine that page A includes content items I_1 and I_5. Therefore, the computer system 102 may include associations between customer U_1 and content items I_1 and I_5 in table 502. In the example shown, the customer identified by identifier U_1 interacted with the content item identified by I_1, but the customer identified by identifier U_N did not interact with the content item identified by I_2. The table may include data for a plurality of combinations of customers and content items of interest. In some embodiments, the table may include data for each possible combination of customer and content of interest, and in other embodiments the table may include data for only some combinations of customer and content of interest. For example, customer U_1 may never have interacted with content I_2, and therefore table 502 does not include data for the combination of customer U_1 and content I_2. It is expressly noted that, while the use of only clickstream embeddings is described herein, the model input may include other customer-related data in addition to the clickstream embeddings. For example, the model input may include customer data as shown in FIG. 6, or any other suitable data related to one or more customers. The additional customer-related data may be provided to the model for all customer identifiers included in the clickstream data, or it may be provided for a subset of the customer identifiers included in the clickstream data.

In step 210, the computer system 102 causes execution of the hybrid latent model. The execution results in cross-system interaction embeddings for each user and item. As described above, the hybrid latent model may be provided by a library such as LightFM and may be executed on computer system 102 or on any other computer system communicatively coupled to computer system 102. For example, the hybrid latent model may be executed on a server system coupled to network 110. In that case, the computer system 102 transmits the input data for the model to server system before causing execution of the hybrid latent model. The output of the model are cross-system interaction embeddings, which include a representation of each customer and item as the sum of the latent representations of their features. An example of cross-system interaction embeddings as generated by the hybrid latent model is shown in tables 506 and 508. Table 506 includes data related to customer features. Each customer identifier of N customers is associated with an embeddings vector of a chosen latent dimensionality. Table 508 includes data related to content item embeddings. Each item of content is associated with an embeddings vector of the same latent dimensionality as the customer embeddings. The output of the hybrid latent model includes a feature vector for each customer identifier found in the input and for each content identifier found in the input. The model is therefore able to generate a feature vector for all identifiers even if the input data is sparse, i.e., does not contain data related to every possible combination of customers and content items.

Figure 10:
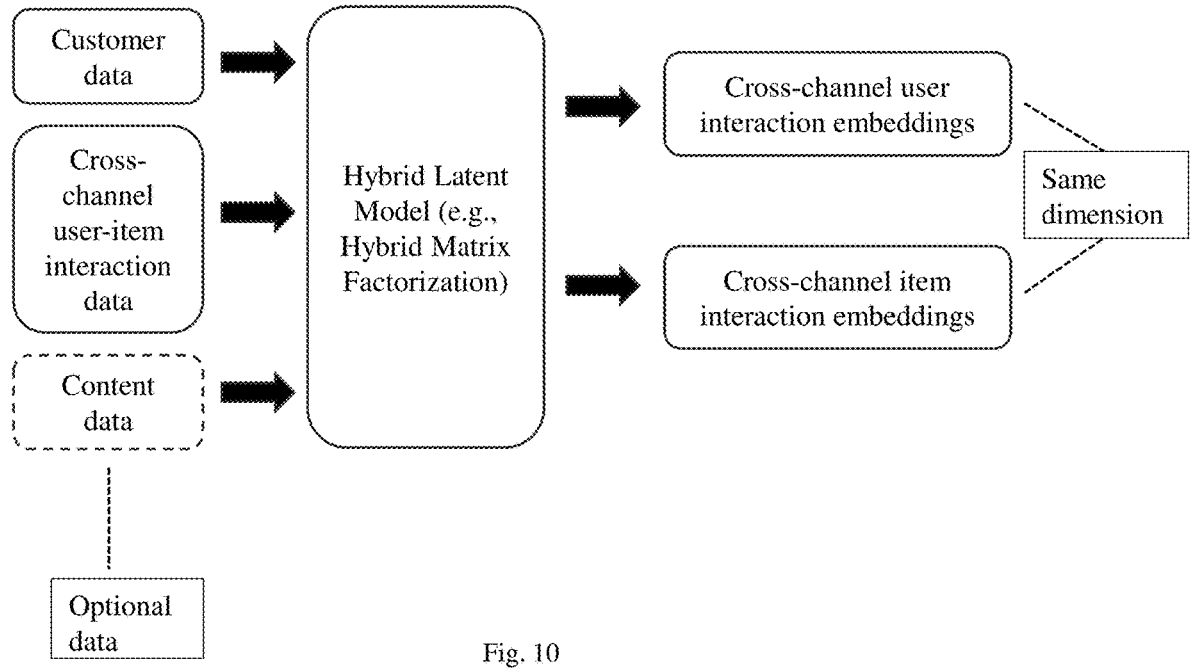
FIG. 10 illustrates execution of a hybrid latent model according to certain embodiments.

The computer system 102 may select the hyperparameters for the hybrid latent model in any suitable way. For example, the computer system 102 may select the dimension of latent features to be 25. As can be seen in tables 506 and 508, each customer embedding therefore has a dimensionality of 25, and each content embedding also has a dimensionality of 25. Computer system 102 may further select additional hyperparameters of the hybrid latent model, such as a weighted approximate-rank pairwise (WARP) loss function, a run time of 20 epochs, an L2 penalty on customer features of 0.0005, and learning rate of 0.001. An exemplary method for completing steps 208 and 210 is shown in FIG. 10.

In step 212, the computer system 102 receives application features corresponding to the clickstream data from an application feature store. The application features relate to each channel found in the clickstream data, or to a subset of the channels found in the clickstream data. An example of application features can be found in table 702 of FIG. 7. Table 702 includes data for several channels, or applications. Each application may be a web page, a mobile app page, or any other suitable channel, and is identified by an application identifier. Table 702 also includes statistical data for each application. For example, the application identified by A_1 was visited by 639,492 customers in total. The application, or a link on it, was clicked 97,646 times, leading to a click-through-rate (CTR) of 0.097 (as some customers may have visited the application more than once). The data may also include one or more statistics related to interactions with the application in a specific timeframe. For example, the data may indicate in column "recent items" that 43 items in the application identified by A_1 in table 702 have been interacted with in a selected time period, such as a day, a week, a month, or any other suitable period. Limiting the statistics to a recent time period allows for a more current view on application interactions, or any other feature, than considering all items at any point in time. It is expressly noted that the application feature store may include additional or different data for each application. Examples for additional statistics are the number of unique customers per application, the number of unique presented content items per application, and usage volume of an application, and/or interaction trends. The data may also include different statistical measures of the raw application feature data. For example, the data may include a maximum number of customer interactions in a day for a given application. This maximum number may have been determined over a selected timeframe. In other examples, the data may include minimum and/or average numbers of customer interactions during a period of time. Similar to what is described above with reference to the customer profile store, the application feature store may be part of computer system 102 or it may be accessed over network 110. For example, the application feature store may be stored in database 114. In another example, the application feature store may be distributed over more than one system.

In step 214, the computer system 102 provides the customer data, the customer clickstream embeddings, the content embeddings, the cross-system interaction embeddings, the user-item interaction data, and the application features as inputs to a recommendation model. The recommendation model may be provided by XGBoost and may include a regularizing gradient boosting framework. Gradient boosting is a known machine learning technique that gives a prediction model in the form of an ensemble of weak prediction models, i.e., models that make very few assumptions about the data, such as simple decision trees. Gradient boosting combines weak learners, such as decision trees, into a single strong learner in an iterative fashion. A detailed description of XGBoost's algorithms is publicly available at xgboost.readthedocs.io/en/stable/tutorials/model.html, which is hereby incorporated by reference in its entirety. The computer system 102 may also select suitable hyperparameters for the gradient boosting model. In an example, the hyperparameters may be selected as follows:

| Parameter | Description | Value |
|---|---|---|
| max_depth | Maximum depth of a tree | 10 |
| learning_rate | Rate to shrink feature weights | 0.03 |
| subsample | Subsample ratio of the training instances | 0.75 |
| colsample_bytree | Subsample ratio of columns | 0.85 |
| colsample_bylevel | Subsample ration of columns for each level | 1 |
| eval_metric | Evaluation metric for validation data | logloss |
| objective | Learning objective | logistic regression |
| gamma | Minimum loss reduction to split a leaf node | 0 |
| min_child_weight | Minimum sum of instance weight for a child node | 1 |
| reg_alpha | L1 regularization of weights | 0 |
| reg_lambda | L2 regularization of weights | 1 |
| n_estimators | Number of trees | 2000 |
| early_stopping_rounds | Early stopping criteria | 100 |

However, it is expressly noted that the computer system 102 may select any other suitable set of hyperparameters for the recommendation model.

Illustratively, the recommendation model was trained with customer interaction data recorded over 10 months from 11 channels/applications, capped to 1 million interactions per application. The training data included more than 100 attributes per customer, more than 20 clickstream embeddings per customer, more than 20 content items and embeddings, cross-channel user and item interaction embeddings of 25 dimensions, about 10 application features such as CTR, number of unique users, number of unique presented content items, usage volume, and interaction trends. Preprocessing the training data using the hybrid latent model resulted in more than 20 cross-channel interaction embeddings based on the customer data and user-item interaction data. The preprocessed data was then provided to the recommendation model as training data. After training, the recommendation model was evaluated using interaction data with similar attributes as the training data but recorded over different months. As an example, for the total data of 12 months, the first 10 months were used for training and the last 2 months were used for evaluation. The evaluation showed that the system and method described herein outperformed other machine learning algorithms such as multi-armed bandit (MAB) or even classic gradient boosting for all applications in the evaluation data.

Figure 11:
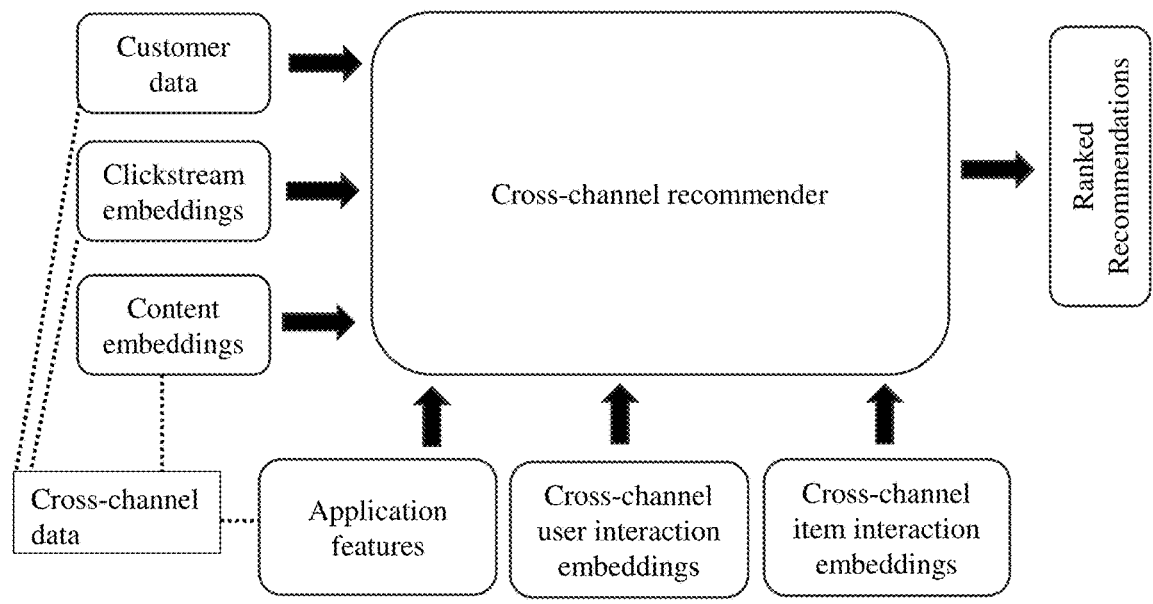
FIG. 11 illustrates execution of a recommendation model according to certain embodiments.

In step 216, the computer system 102 causes execution of the recommendation model. The execution results in a plurality of ranked recommendations. The recommendation model may be hosted on a separate machine learning platform such as machine learning platform 112. In that case, the computer system 102 may transmit the customer data, user clickstream embeddings, content embeddings, cross-system interaction embeddings, and application features over network 110 to machine learning platform 112 before causing execution of the recommendation model. In other embodiments, machine learning platform 112 may be part of computer system 102. The recommendations generated by the recommendation model indicate what content item a given customer is most likely to engage with, such as what content item the customer is most likely to click on. Each recommendation therefore corresponds to a content item of the content data. The content item may be a part of the content data that the model has been trained on, or any new input features provided to the recommender. This allows the recommendation model to make a recommendation for any combination of customer features and content features, even if the cross-system interaction data for the combination does not exist. The recommendation model may infer suitable default values for the non-existing data. Illustratively, the plurality of recommendations generated by the recommendation model are ranked by likelihood of interaction. This means that the recommendation ranked first is the content item that the model predicted to have the highest likelihood of customer interaction, the recommendation ranked second is the content item that the model predicted to have the second highest likelihood of interaction, and so forth. It is expressly contemplated that more than one recommendation model is trained and utilized to generate the plurality of ranked recommendations. For example, the computer system 102 may cause execution of five separate recommendation models trained with the same training data and provided with the same input data to generate five sets of ranked recommendations. The computer system 102 may then average the five sets of ranked recommendations to arrive at the plurality of ranked recommendations. Averaging more than one set of recommendations may improve the performance of the method 200. The number of models is one of the important hyperparameters that is carefully tuned to fit the training data. An exemplary method for completing step 216 is shown in FIG. 11.

In some embodiments, the computer system 102 post-processes the plurality of ranked recommendations received from the recommendation model. The computer system 102 may filter the plurality of ranked recommendations. The filtering may include, for example, removing recommendations that have already been presented to the customer a given number of times. Illustratively, the computer system 102 may remove recommendations that have been presented already three times. Filtering out recommendations that have been presented too often improves the diversity of the recommended content items and therefore improves the likelihood of the customer interacting with the recommended content items. The computer system 102 may also filter the plurality of content items based on business decisions or business policies. For example, the computer system 102 may remove recommendations that are no longer desired by the business. Alternatively, or in addition, the computer system 102 may re-rank the plurality of recommendations. The re-ranking may be based on any suitable factor, for example on business rules. In other words, the computer system 102 may adjust the ranking of the plurality of the recommendations to better align with business policies. A recommendation that was ranked first in the model output may be swapped with a recommendation ranked second if the second-ranked recommendation better aligns with the policies of the business or with any desired business developments.

In some embodiments, the computer system 102 may also cause display of at least one of the plurality of recommendations to a customer. The recommendations may also have been filtered and/or re-ranked as described above. For example, the computer system 102 may cause display of one or more of the plurality of ranked recommendations on a web page or in a mobile app that the customer uses, or in an interaction of the customer with a virtual assistant. Any number of recommendations may be displayed. The computer system 102 may cause display of only the highest ranked recommendation, of the first two recommendations, or any other suitable number of recommendations from the plurality of recommendations. In other examples, the computer system 102 may cause one or more of the plurality of recommendations to be included in an email to the customer. The recommendations may also appear in more than one channel, such as on web page and in an email.

Embodiments of the present invention may be embodied in many different forms, including, but in no way limited to, computer program logic for use with a processor (e.g., a microprocessor, microcontroller, or digital signal processor), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, networker, or locator.) Source code may include a series of computer program instructions implemented in any of various programming languages (e.g., an object code, an assembly language, or a high-level language such as Fortran, C, C++, Python, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), pre-loaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

The foregoing description described certain example embodiments. It will be apparent, however, that other variations and modifications may be made to the described embodiments, with the attainment of some or all of their advantages. Accordingly, the foregoing description is to be taken only by way of example, and not to otherwise limit the scope of the disclosure. It is the object of the appended claims to cover all such variations and modifications as come within the true spirit and scope of the disclosure.

What is claimed is:

1. A computer-implemented method for generating a plurality of cross-channel recommendations for a customer, the method comprising:
   receiving, by a computer system, customer data associated with the customer, content data, and clickstream data;
   encoding, by the computer system, the content data using a text encoder, the encoding resulting in content embeddings;
   encoding, by the computer system, the clickstream data using a clickstream encoder, the encoding resulting in clickstream embeddings;
   providing, by the computer system, one or more of the content data, the clickstream data, user-item interaction data, the customer data, and clickstream embeddings as inputs to a hybrid latent model;
   causing, by the computer system, execution of the hybrid latent model, the execution resulting in cross-channel interaction embeddings;
   retrieving, by the computer system, application features corresponding to the clickstream data from an application feature store;
   providing, by the computer system, the customer data, the clickstream embeddings, the content embeddings, the cross-system interaction embeddings, the user-item interaction data, and the application features as inputs to a recommendation model; and
   causing, by the computer system, execution of the recommendation model, the execution resulting in a plurality of ranked recommendations.

2. The computer-implemented method of claim 1, wherein the clickstream data includes data from a plurality of channels and at least one channel of the plurality of channels has a different type from another channel of the plurality of channels.

3. The computer-implemented method of claim 1, wherein the clickstream data includes at least one of clickstream data associated with the customer and a channel and clickstream data associated with the customer within a timeframe.

4. The computer-implemented method of claim 1, wherein the customer data includes at least one of demographic data, account data, and transaction data.

5. The computer-implemented method of claim 1, wherein the application features include at least one of click-through-rate, number of unique customers, number of unique presented items, and usage volume.

6. The computer-implemented method of claim 1, further comprising filtering, by the computer system, the plurality of ranked recommendations.

7. The computer-implemented method of claim 1, further comprising re-ranking, by the computer system, the plurality of ranked recommendations.

8. The computer-implemented method of claim 1, wherein the hybrid latent model includes a matrix factorization framework.

9. The computer-implemented method of claim 1, wherein the recommendation model uses gradient boosting.

10. The computer-implemented method of claim 1, further comprising causing, by the computer system, display of at least one of the plurality of recommendations to the customer.

11. A system for generating a plurality of cross-channel recommendations for a customer, the system comprising:
 a hybrid latent model;
 a recommendation model; and
 a computer system having a processor coupled to a memory, the computer system communicatively coupled to the hybrid latent model and to the recommendation model, the processor configured to:
  receive customer data associated with the customer, content data, and clickstream data;
  encode the content data using a text encoder, the encoding resulting in content embeddings;
  encode the clickstream data using a clickstream encoder, the encoding resulting in clickstream embeddings;
  provide the customer data, the clickstream data, and the clickstream embeddings as inputs to the hybrid latent model;
  cause execution of the hybrid latent model, the execution resulting in cross-system interaction embeddings;
  retrieve application features corresponding to the clickstream data from an application feature store;
  provide the customer data, the clickstream embeddings, the content embeddings, the cross-system interaction embeddings, user-item interaction data, and the application features as inputs to a recommendation model; and
  cause execution of the recommendation model, the execution resulting in a plurality of ranked recommendations.

12. The system of claim 11, wherein the clickstream data includes data from a plurality of channels and at least one channel of the plurality of channels has a different type from another channel of the plurality of channels.

13. The system of claim 11, wherein the clickstream data includes at least one of clickstream data associated with the customer and a web page and clickstream data associated with the customer within a timeframe.

14. The system of claim 11, wherein the customer data includes at least one of demographic data, account data, and transaction data.

15. The system of claim 11, wherein the processor is further configured to filter the plurality of ranked recommendations.

16. The system of claim 11, wherein the processor is further configured to re-rank the plurality of ranked recommendations.

17. The system of claim 11, wherein the application features include at least one of click-through-rate, number of unique customers, number of unique presented items, and usage volume.

18. The system of claim 11, wherein the hybrid latent model includes a matrix factorization framework.

19. The system of claim 11, wherein the recommendation model uses gradient boosting.

20. A non-transitory computer-readable medium having software encoded thereon, the software, when executed by a computer system, operable to:
 receive customer data associated with a customer, content data, and clickstream data;
 encode the content data using a text encoder, the encoding resulting in content embeddings;
 encode the clickstream data using a clickstream encoder, the encoding resulting in clickstream embeddings;
 provide the content data, the clickstream data, and one or more of the clickstream embeddings and customer data as inputs to a hybrid latent model;
 cause execution of the hybrid latent model, the execution resulting in cross-system interaction embeddings;
 retrieve application features corresponding to the clickstream data from an application feature store;
 provide the customer data, the content embeddings, the clickstream embeddings, the cross-system interaction embeddings, and the application features as inputs to a recommendation model; and
 cause execution of the recommendation model, the execution resulting in a plurality of ranked recommendations.

* * * * *